US005463295A

United States Patent [19]

Inde

[11] Patent Number: 5,463,295

[45] Date of Patent: Oct. 31, 1995

[54] FACSIMILE APPARATUS WITH CONTROL OF RESOLUTION TO BE COMPATIBLE WITH RECEIVING SIDE

[75] Inventor: Masaaki Inde, Higashimurayama, Japan

[73] Assignee: Canon Kabushiki Kaisha, Tokyo, Japan

[21] Appl. No.: 311,886

[22] Filed: Sep. 26, 1994

Related U.S. Application Data

[63] Continuation of Ser. No. 894,860, Jun. 5, 1992, abandoned.

[30] Foreign Application Priority Data

Jun. 7, 1991 [JP] Japan .................................... 3-136283

[51] Int. Cl.$^{6}$ .............................. H04N 1/40; H04M 1/00

[52] U.S. Cl. ............................................ 358/442; 358/447

[58] Field of Search .................................... 358/133, 135, 358/136, 260, 261.3, 261.1, 302, 400, 405, 404, 426, 444–530; 364/715.02, 242.2

[56] References Cited

U.S. PATENT DOCUMENTS

| | | | |
|---|---|---|---|
| 5,235,43 | 8/1983 | Creedon et al. | 358/479 |
| 4,463,386 | 7/1984 | Goddard et al. | 358/261 |
| 4,772,955 | 9/1988 | Kurahayashi et al. | 358/257 |
| 4,774,590 | 9/1988 | Haganuma et al. | 358/280 |
| 4,796,092 | 1/1989 | Ogata | 358/261.1 |
| 4,811,109 | 3/1989 | Shimizu et al. | 358/256 |
| 4,814,890 | 3/1989 | Kato | 358/280 |
| 4,814,894 | 3/1989 | Yoshida | 358/298 |
| 4,827,349 | 5/1989 | Ogata et al. | 358/256 |
| 4,845,569 | 7/1989 | Kurabayashi et al. | 358/400 |
| 4,876,604 | 10/1989 | Nobuta | 358/400 |
| 4,974,097 | 11/1990 | Kaneko et al. | 358/400 |
| 4,975,786 | 12/1990 | Katayama et al. | 358/459 |
| 5,075,784 | 12/1991 | Momose | 358/447 |
| 5,235,436 | 8/1993 | Sakamoto et al. | 358/462 |

FOREIGN PATENT DOCUMENTS

| | | | |
|---|---|---|---|
| 483969 | 5/1992 | European Pat. Off. | H04N 1/32 |
| 3-30571 | 2/1991 | Japan | H04N 1/32 |
| 86-5055 | 8/1986 | WIPO | H04N 1/00 |

*Primary Examiner*—Paul Ip
*Attorney, Agent, or Firm*—Fitzpatrick, Cella, Harper & Scinto

[57] ABSTRACT

A facsimile apparatus of this invention discriminates a reception-possible resolution of a reception-side facsimile apparatus. When the discriminated resolution does not coincide with the resolution of read document information, the original reading resolution is converted to one acceptable at reception side, and the converted resolution is displayed as a transmission resolution.

12 Claims, 8 Drawing Sheets

KEYBOARD 5 · FIRST DISPLAY UNIT 6 · SECOND DISPLAY UNIT 7 · SCANNER 2 · SCANNER CONTROLLER 12 · MAIN CONTROLLER 11 · 1 · ROM 18 · RAM 19 · BUS 17 · PRINTER 3 · PRINTER CONTROLLER 13 · IMAGE MEMORY 14 · IMAGE CONVERTER 15 · COMMUNICATION CONTROLLER 16 · COMMUNICATION LINE 4

| ADDRESS | CONTENT |
|---|---|
| ⋮ | ⋮ |
| $A_R$ | READING RESOLUTION INFORMATION |
| $A_S$ | TRANSMISSION RESOLUTION INFORMAITON |
| ⋮ | ⋮ |
| $A_1$ | RECEPTION POSSIBLE RESOLUTION INFORMATION (1) |
| $A_2$ | RECEPTION POSSIBLE RESOLUTION INFORMATION (2) |
| ⋮ | ⋮ |
| $A_N$ | RECEPTION POSSIBLE RESOLUTION INFORMATION (N) |
| ⋮ | ⋮ |
| $A_n$ | RECEPTION POSSIBLE RESOLUTION INDEX |

FACSIMILE APPARATUS WITH CONTROL OF RESOLUTION TO BE COMPATIBLE WITH RECEIVING SIDE

This application is a continuation of application Ser. No. 07/894,860, filed Jun. 5, 1992, now abandoned.

BACKGROUND OF THE INVENTION

The present invention relates to a facsimile apparatus, which changes the transmission resolution in correspondence with the resolution at a reception side.

In recent years, many facsimile apparatuses have optional resolutions, which it is permitted to use, as well as a standard resolution as transmission-or reception-possible resolutions.

On the other hand, some facsimile apparatuses have a function of temporarily storing read document information in a memory, and then transmitting the stored document information, and sequentially using the stored document information in, e.g., a multi-address communication mode.

In a general communication procedure of a facsimile communication, setting of a call, identification of capability (e.g., a resolution) of a facsimile apparatus on the other end of a line, transfer of document information, release of a call, and the like are executed. Of these operations, in identification of the capability of the facsimile apparatus on the other end of the line, a transmission-side facsimile apparatus identifies information indicating a reception-possible resolution, which information is sent from a reception-side facsimile apparatus. In transfer of document information, document data having a resolution other than the resolution indicated by the resolution information as the capability of a facsimile apparatus on the other end of the line must not be transmitted.

Therefore, in a facsimile apparatus which temporarily stores read document information in a memory, and then transmits the stored document information, when document information to be transmitted is converted into data having a resolution different from a reading resolution, the reading resolution does not often coincide with that of the document information to be actually transmitted.

In the conventional facsimile apparatus, means for informing the resolution of document information to be actually transmitted to an operator is insufficient. For this reason, the operator cannot confirm whether or not document information is transmitted at a desired resolution.

Even when a display unit for displaying the resolution of document information is arranged on a facsimile apparatus, and a transmission resolution is displayed on the display unit, since a reading resolution and the transmission resolution cannot be displayed at the same time, an operator cannot adequately recognize whether or not the reading resolution is changed upon transmission.

SUMMARY OF THE INVENTION

It is an object of the present invention to provide a facsimile apparatus which displays a transmission resolution when a resolution of read document information does not coincide with the transmission resolution, whereby an operator can be clearly informed of a coincidence/non-coincidence between the reading resolution and the transmission resolution.

In order to achieve the above object, according to the present invention, a facsimile apparatus for reading an original at a designated resolution, comprises means for identifying a reception-possible resolution of a reception-side facsimile apparatus, discrimination means for discriminating whether or not a designated original reading resolution coincides with the reception-possible resolution, conversion means for, when the discrimination means determines that the two resolutions do not coincide with each other, converting the designated original reading resolution into the reception-possible resolution, and display means for displaying the converted resolution as a transmission resolution.

It is preferable that the conversion means determines a maximum value of reception-possible resolutions, which value does not exceed the original reading resolution, as the reception-possible resolution.

It is also preferable that the display means displays the transmission resolution only when the reception-possible resolution does not coincide with the designated original reading resolution.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a view showing the internal arrangement of a RAM for storing resolution information.

DETAILED DESCRIPTION OF THE PREFERRED EMBODIMENT

The preferred embodiment according to the present invention will be described in detail hereinafter with reference to the accompanying drawings.

Figure 1:
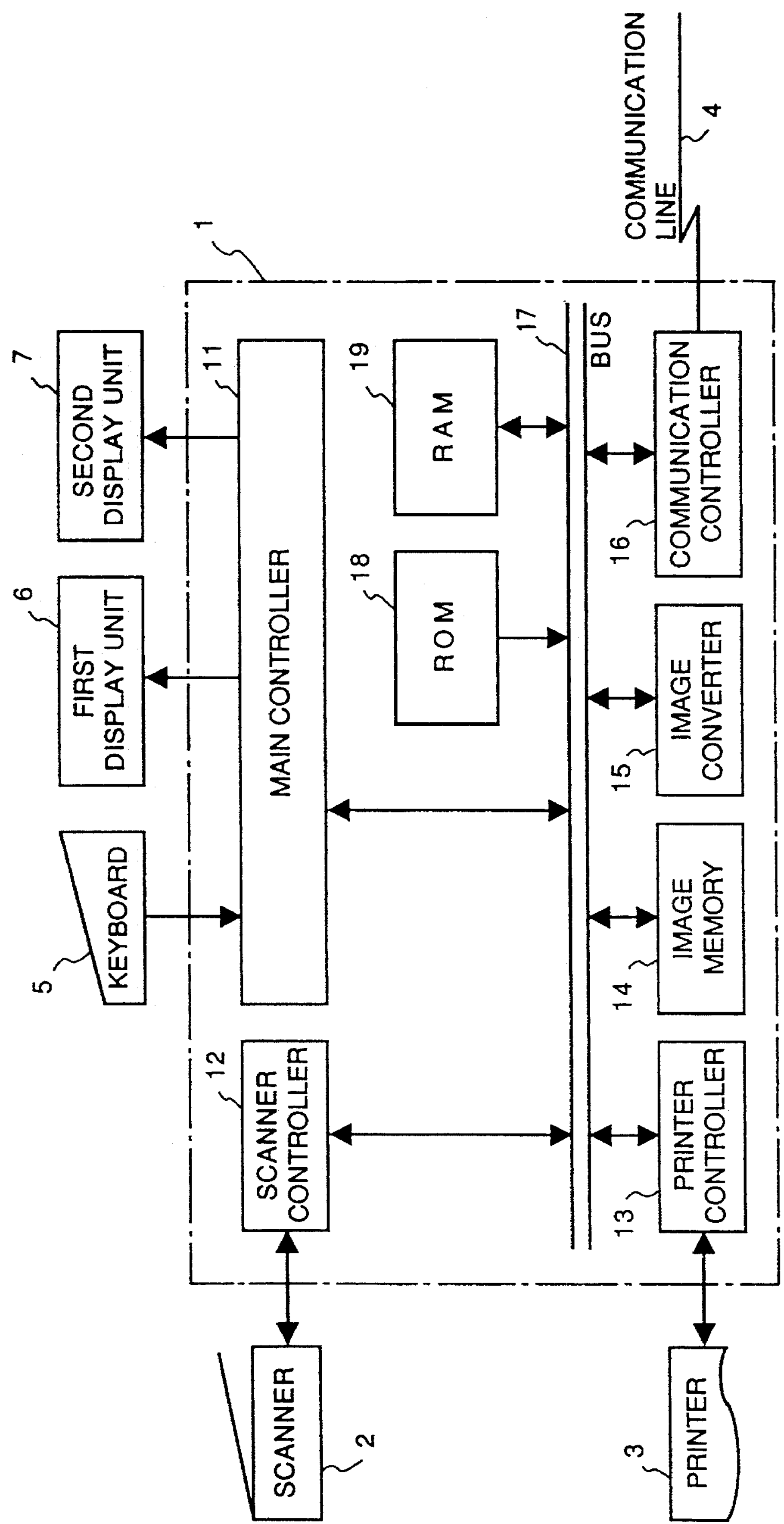
FIG. 1 is a block diagram showing an arrangement of a facsimile apparatus according to an embodiment of the present invention.

FIG. 1 is a block diagram showing an arrangement of a facsimile apparatus according to an embodiment of the present invention. In FIG. 1, a facsimile apparatus is constituted by a main body 1, a scanner 2, a printer 3, a communication line 4, a keyboard 5 for performing various operations, a first display unit 6 for displaying a reading resolution, and a second display unit 7 for displaying a transmission resolution, and other messages.

The facsimile apparatus main body 1 is constituted by a main controller 11 for performing control of the overall apparatus and other control operations, a scanner controller 12, a printer controller 13, an image memory 14 having a capacity capable of storing a predetermined amount of image data, an image converter 15 for performing pixel density conversion and compression/expansion of image data, a communication controller 16, a data bus 17, a ROM 18 for storing, e.g., a control program, and a RAM 19 for storing values indicating a reading resolution, a reception-possible resolution of a facsimile apparatus on the other end of a line, a transmission resolution, and the like, and other kinds of information.

The control procedure in the facsimile apparatus according to this embodiment will be described below.

Figure 2:
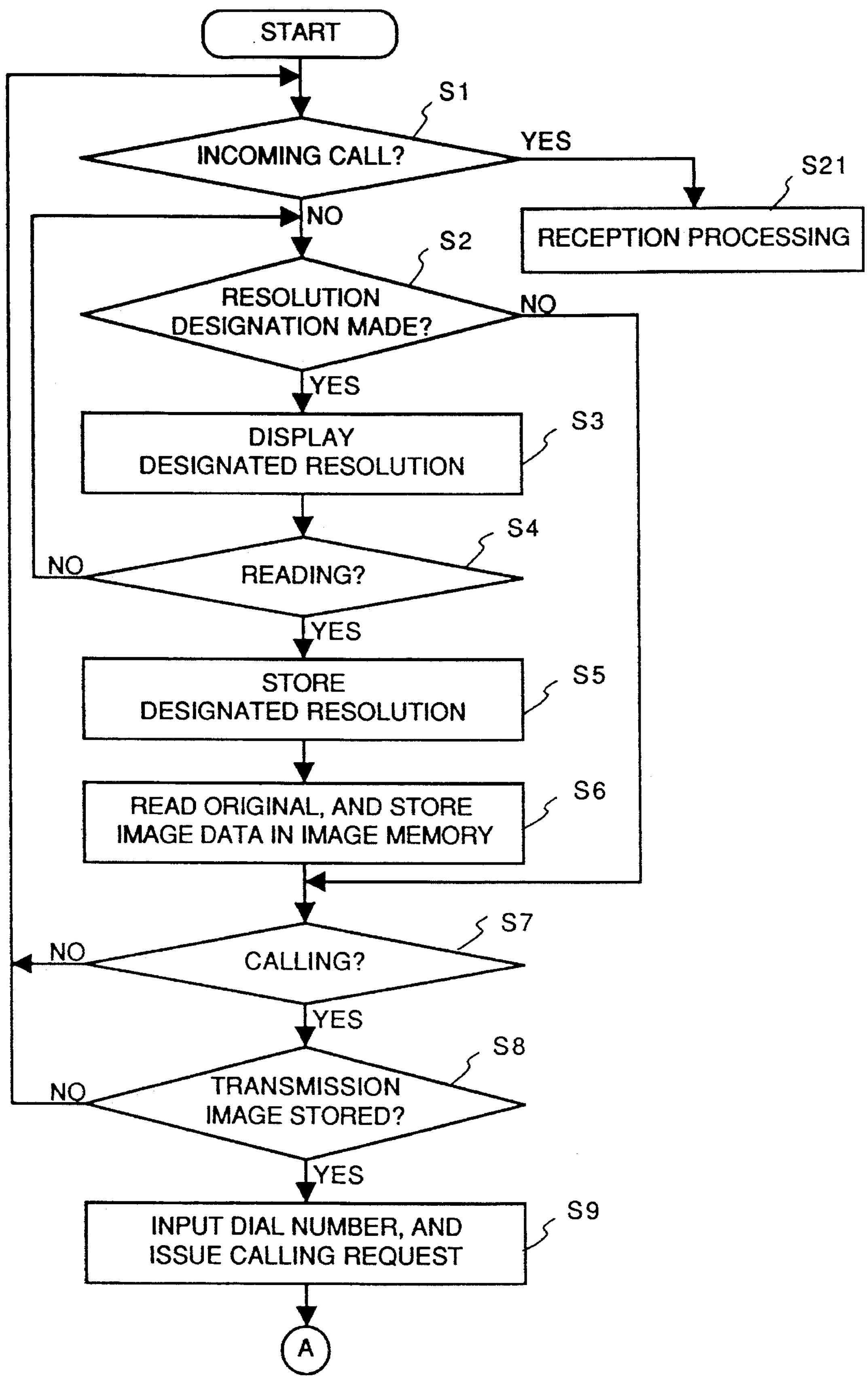
FIGS. 2, 3, and 4 are flow charts showing a control procedure in the facsimile apparatus according to the embodiment.
Figure 3:
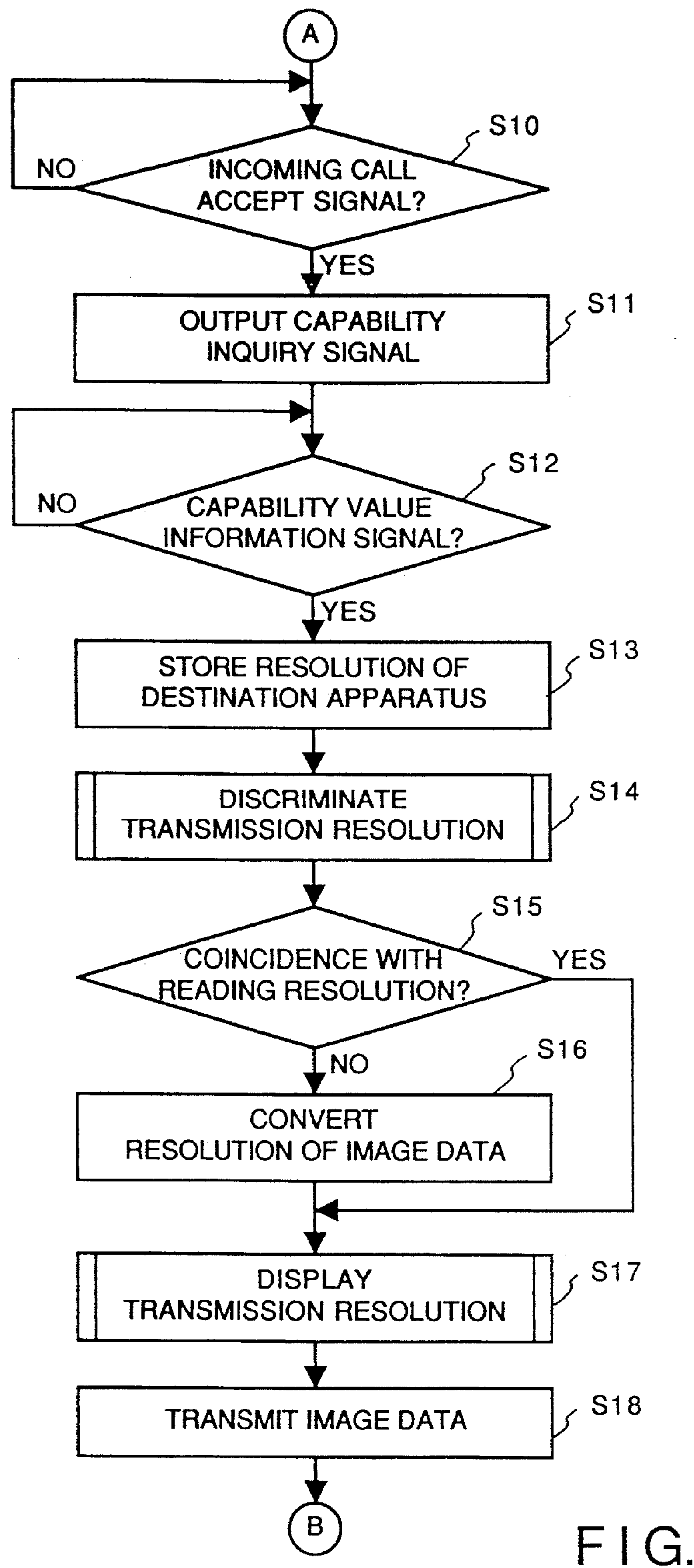
Figure 4:
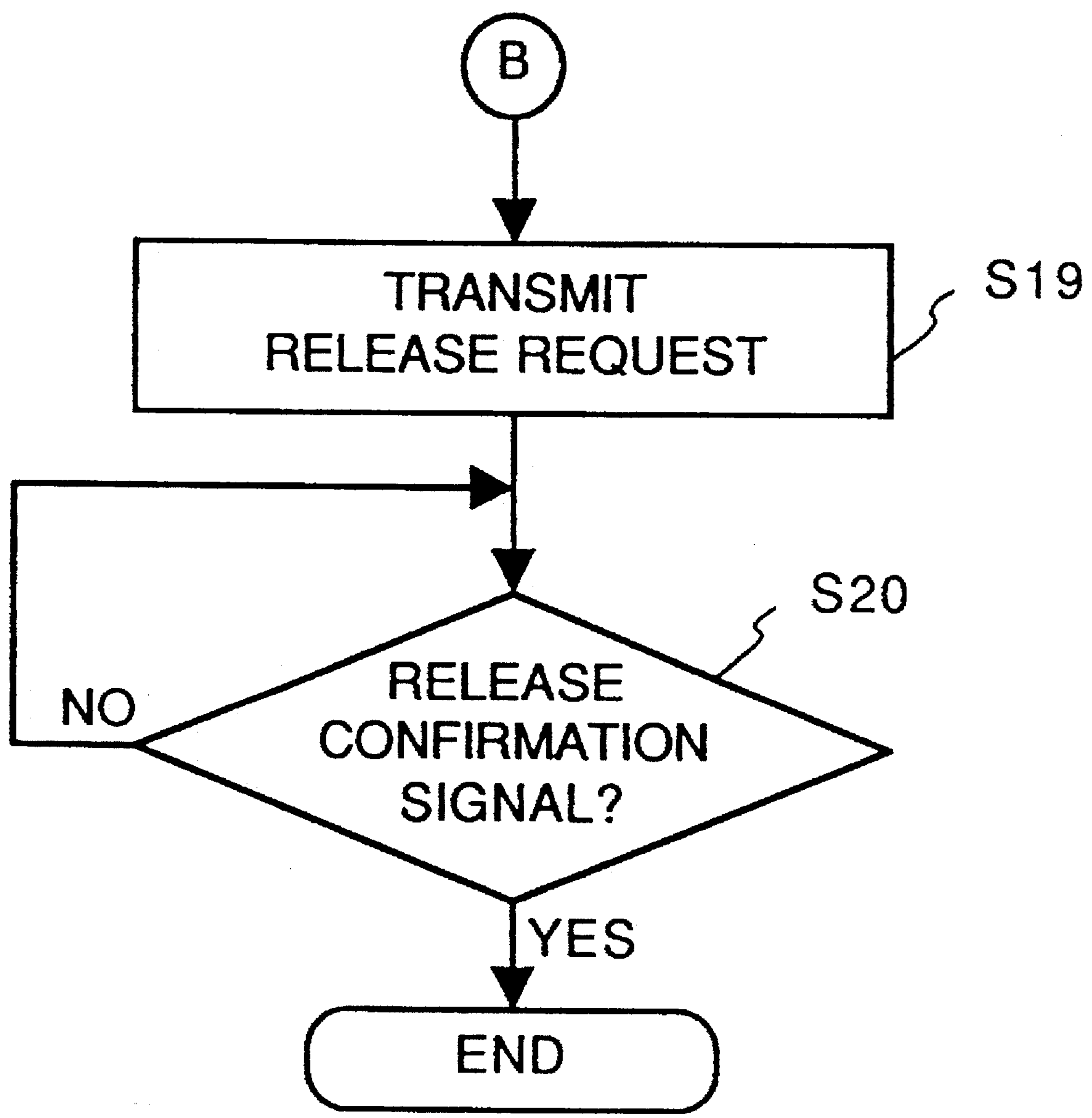

FIGS. 2 to 4 are flow charts showing the control procedure in the facsimile apparatus of this embodiment. In FIG. 2, it is monitored in step S1 if an incoming call is detected. If YES in step S1, normal reception processing is performed in step S21. However, if NO in step S1, an input from the keyboard 5 is monitored in step S2 to determine if a key input for designating a resolution is made. If YES in step S2, information indicating the designated resolution is displayed on the first display unit 6 in step S3. The resolution information is displayed by the following method. That is, lamps corresponding to available resolutions are arranged on the first display unit 6, only the lamp corresponding to the designated resolution is turned on, and other lamps are kept off, thus informing the designation resolution to an operator.

In step S4, it is monitored whether or not a key input for instructing a reading operation is made at the keyboard 5. If NO in step S4, it is determined that an operator wants to change the reading resolution designated in step S2, and the flow returns to step S2 since the resolution can be changed before the reading instruction is input. However, if YES in step S4, the value indicating the reading resolution designated in step S2 is stored in a reading resolution information area (not shown) in the RAM 19 in step S5. In step S6, an instruction is supplied to the scanner controller 12 to cause the scanner 2 to read an original at the designated resolution, and the read image data is stored in the image memory 14.

It is monitored in step S7 whether a calling instruction is input. If YES in step S7, it is checked in step S8 whether an image to be transmitted is stored in the image memory 14. If YES in step S8, a dial number input from the keyboard 5 is accepted in step S9, and a calling request signal 21 is sent to a facsimile apparatus on the other end of the line through the communication controller 16 and the communication line 4.

If it is determined in step S2 that no resolution designation is made, the flow jumps to step S7. If it is determined in step S7 that a calling instruction is detected, since an image to be transmitted is not stored (since steps S5 and S6 are not executed), NO is determined in step S8, and the flow returns to step S1.

Figure 5:
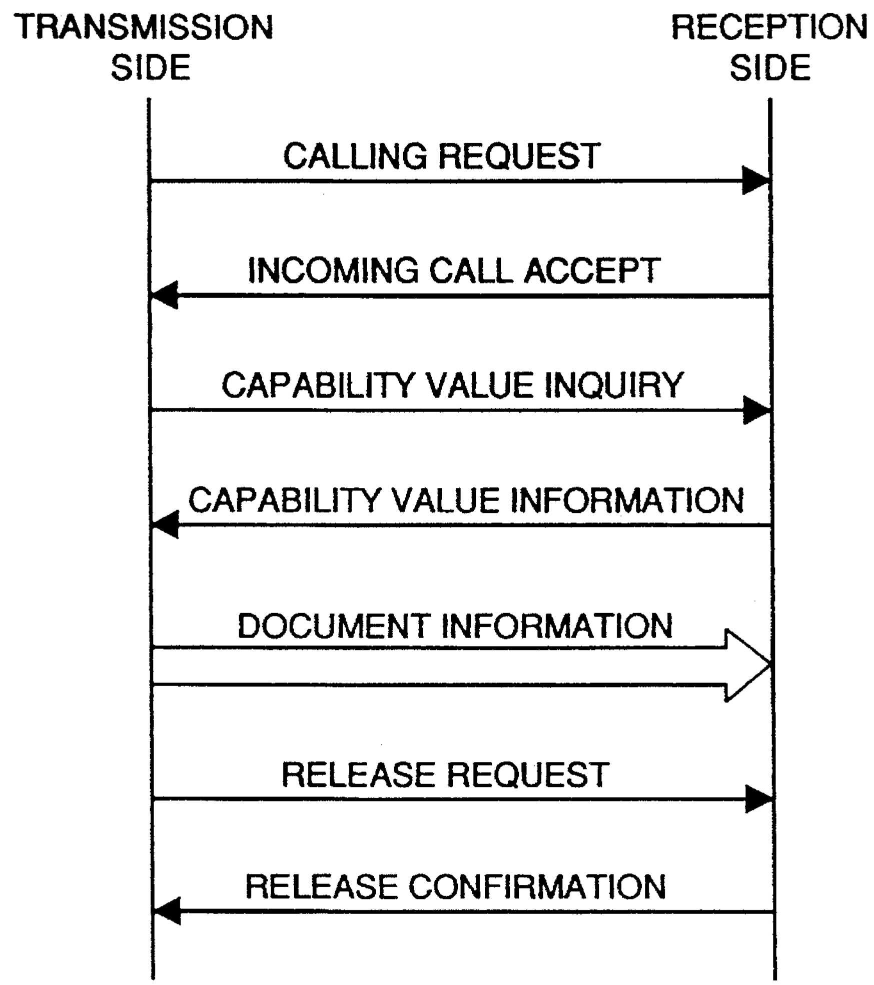
FIG. 5 is a chart showing a signal sequence in the facsimile apparatus.
Figure 6:
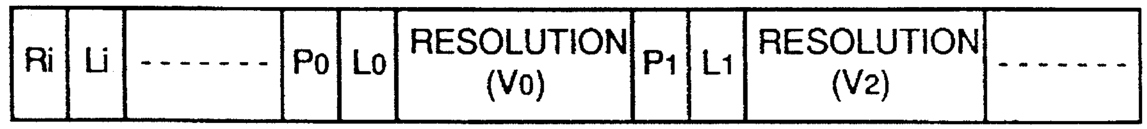
FIG. 6 shows a format of resolution information included in a capability value information signal.

After the calling request signal 21 is sent in step S9 in FIG. 2, the control waits for an incoming call accept signal from the facsimile apparatus on the other end of the line in step S10 in FIG. 3 (see the signal sequence chart of FIG. 5). If an incoming call accept signal is received, a capability value inquiry signal is sent in step S11. When a capability value information signal is received in step S12, the flow advances to step S13 to analyze resolution information included in the capability value information signal according to the format shown in FIG. 6. The analysis result is stored in a reception-possible resolution information area (not shown) in the RAM 19.

In step S14, a transmission resolution is discriminated by a method to be described later, and the discrimination result is written in a transmission resolution information area (not shown) in the RAM 19. In step S15, the contents of the reading resolution information area and the transmission resolution information area are compared with each other. If the contents in these areas coincide with each other, the flow jumps to step S17. However, if the contents do not coincide with each other, resolution conversion is performed in step S16, and thereafter, the flow advances to step S17. (Resolution conversion can also be expressed as a change in coarseness of image.) In step S17, the actual transmission resolution is displayed on the second display unit 7. Note that details of the processing in step S17 will be described later.

In step S18, image data is transmitted. After the transmission of the image data is ended, a release request signal is sent in step S19 in FIG. 4. In step S20, the controller waits for a response from the facsimile apparatus on the other end of the line. When a release confirmation signal is received, this processing is ended.

The transmission resolution discrimination processing in step S14 in FIG. 3 will be described in detail below with reference to the flow chart shown in FIG. 7. In this embodiment, as a value indicating each resolution, a larger value is assigned as the resolution becomes denser. FIG. 8 shows the internal arrangement of the RAM 19 for temporarily storing resolution information. In the flow chart shown in FIG. 7, contents indicated by addresses of the RAM 19 are expressed by the addresses with parentheses.

Figure 7:
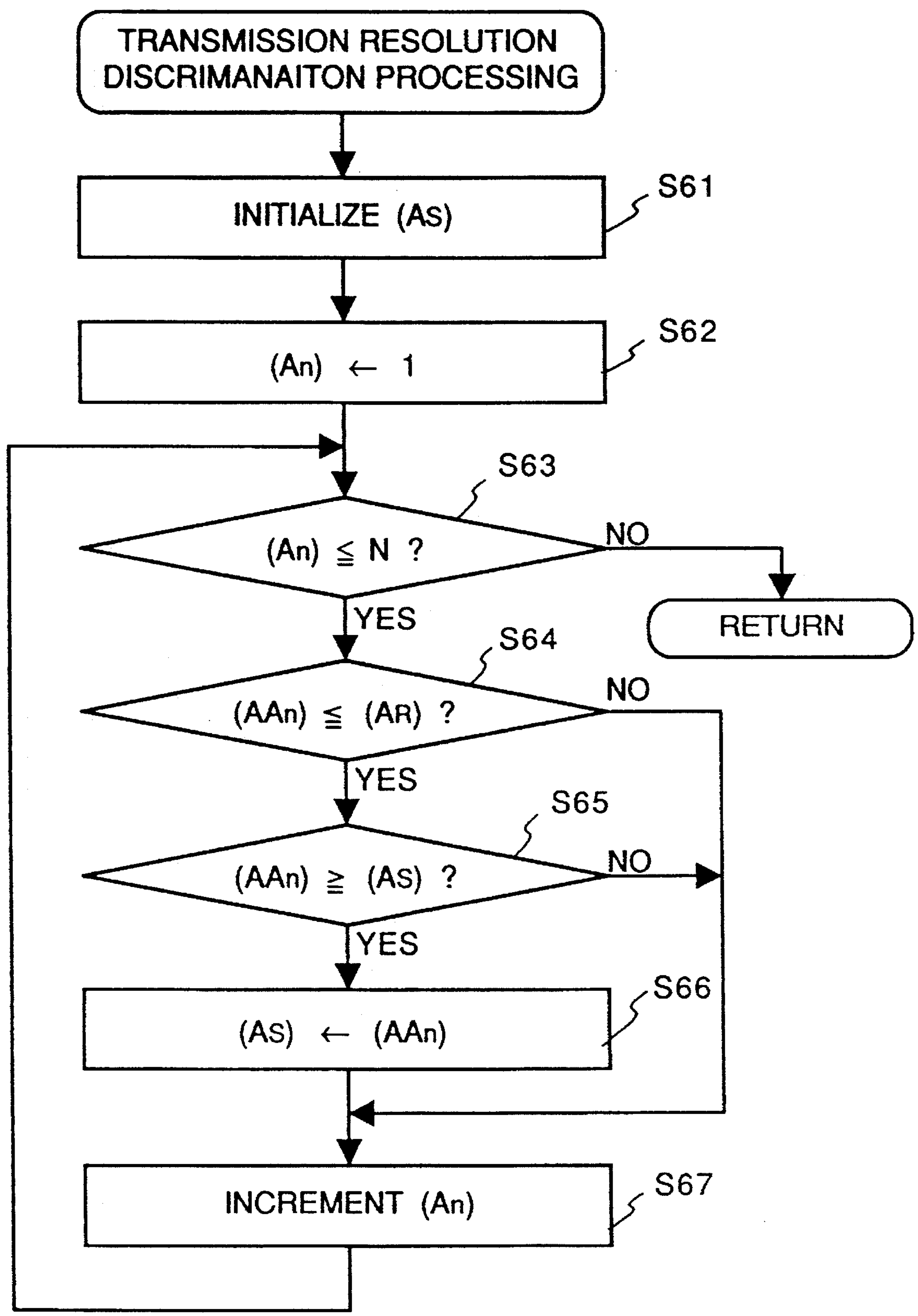
FIG. 7 is a detailed flow chart of transmission resolution discrimination processing.

In FIG. 7, in step S61, transmission resolution information 42 corresponding to an address as shown in FIG. 8 is initialized to a value corresponding to an indispensable resolution in the facsimile communication standard. In step S62, the value of an index indicating pieces of reception-possible resolution information $(A_1)$ to $(A_N)$ is set to be "1". In step S63, it is checked if the index value $(A_n)$ is equal to or smaller than a maximum value N. If YES in step S63, reception-possible resolution information $(A(A_n))$ corresponding to the index value is compared with a reading resolution $(A_R)$ in step S64. If $(A(A_n)) \leqq (A_R)$ , the flow advances to step S65. In step S65, it is checked if $(A(A_n)) \geqq (A_S)$. If YES in step S65, $(A(A_n))$ is written in $(A_S)$ in step S66, and the index value $(A_n)$ is incremented in step S67. Thereafter, the flow returns to step S63. These processing operations are repeated until $(A_n) > N$ is satisfied.

With this processing, resolution information, the value of which is equal to or smaller than the reading resolution, and is maximum (densest) within a range of a reception resolution information can be determined as transmission resolution information. On the other hand, if it is determined in step S64 that $(A(A_n)) > (A_R)$, since the reception resolution is higher than the reading resolution, its value is not used as the transmission resolution. If it is determined in step S65 that $(A(A_n)) < (A_S)$, since the reception resolution is lower than the maximum resolution already searched in the previous step, its value is not used as the transmission resolution.

Figure 9:
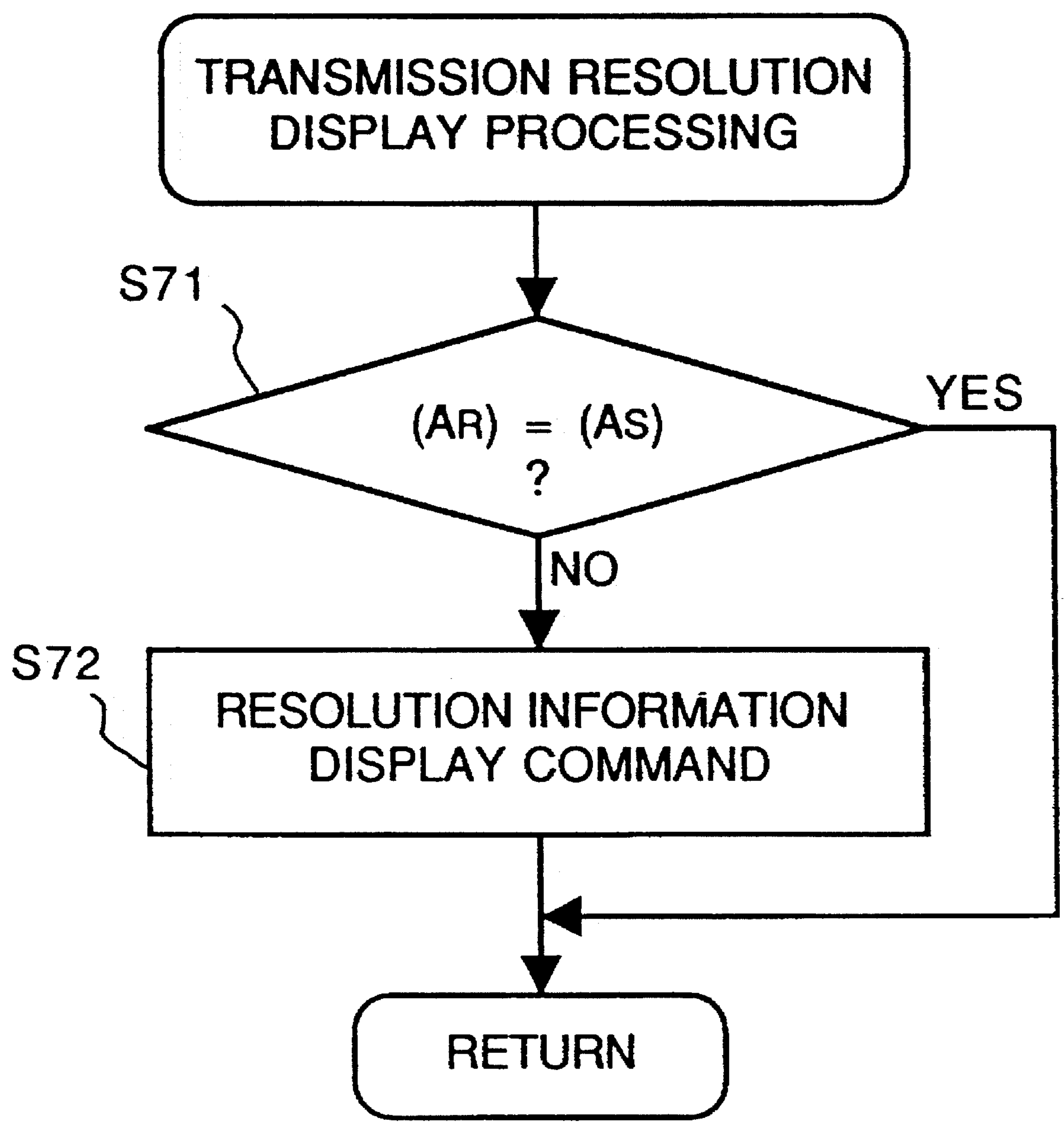
FIG. 9 is a detailed flow chart of transmission resolution display processing.

The flow chart of FIG. 9 shows details of step S17 in FIG. 3. In FIG. 9, in step S71, transmission resolution information $(A_S)$ and reading resolution information $(A_R)$ are compared with each other. If the two pieces of information do not coincide with each other, the flow advances to step S72, and a message corresponding to the transmission resolution information is displayed on the second display unit 7.

If YES in step S71, the flow returns without displaying resolution information.

In this manner, when a resolution of a facsimile apparatus on the other end of the line is within a range capable of receiving data from a transmission side and the maximum value of an original reading resolution designated by an operator is determined as a transmission resolution and when the designated reading resolution and the actual transmission resolution are different from each other, the transmission resolution is visually displayed. Thus, when the reading resolution is changed upon transmission, an operator can adequately recognize the change state.

In the above embodiment, only when the reading resolution does not coincide with the transmission resolution, is the transmission resolution displayed. It is permissible to adopt an arrangement in which, when the reading resolution does not coincide with the transmission resolution, the display of the transmission resolution may be caused to flash at a predetermined cycle; when the two resolutions coincide with each other, the transmission resolution may be continuously displayed. In this manner, a coincidence/non-coincidence between the reading resolution and the transmission resolution can be more clearly informed.

Further, an arrangement can be adopted in which the transmission information displayed on the second display unit may be a pattern such as a pictorial pattern according to resolution information or a lamp indication corresponding to the resolution in place of characters.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus for reading an original at a designated resolution, comprising:

means for identifying a reception-possible resolution of a reception-side facsimile apparatus;

discrimination means for discriminating whether or not the designated original reading resolution coincides with the reception-possible resolution;

conversion means for, when said discrimination means determines that the two resolutions do not coincide with each other, converting the designated original reading resolution into the reception-possible resolution of a different coarseness of image from said designated original reading resolution; and display means for displaying the converted, reception-possible resolution as a resolution of transmission data, wherein said display means displays said converted, reception-possible resolution in the discriminating form that a coarseness of image represented by the reception-possible resolution of the transmission data is different from that of said designated original reading resolution.

2. The apparatus according to claim 1, wherein said conversion means determines a maximum value of reception-possible resolutions, which value is less than or equal to the original reading resolution, as the reception possible resolution.

3. The apparatus according to claim 1, wherein said display means displays the transmission resolution only when the reception-possible resolution does not coincide with the designated original reading resolution.

4. The apparatus according to claim 1, wherein said display means simultaneously displays the designated original reading resolution and the transmission resolution.

5. The apparatus according to claim 1, wherein said display means displays the transmission resolution using a predetermined pictorial pattern.

6. A control method for controlling a facsimile apparatus, comprising the steps of:

discriminating a designated resolution at a transmission side;

detecting a possible resolution of a reception side;

converting the designated resolution into a reception-possible resolution of a coarseness of image different from that of the designated resolution when a resolution discriminated in said discriminating step does not coincide with a resolution detected in said detecting step; and displaying the converted, reception-possible resolution as a resolution of transmission data, wherein said converted, reception-possible resolution is displayed in said displaying step in the discrimination form that a coarseness of image represented by the reception-possible resolution of the transmission data is different from that of said designated resolution.

7. The control method of claim 6, wherein said transmission resolution is a resolution which is less than or equal to the designated resolution and a maximum value of reception-possible resolutions.

8. A control method for controlling a facsimile apparatus, comprising the steps of:

storing a transmission image at a designated resolution;

detecting a possible resolution of a reception-side;

converting the designated resolution into a reception-possible resolution of a coarseness of image different from that of the designated resolution when the designated resolution of said transmission image does not coincide with a resolution detected in said detecting step; and displaying the converted resolution as a resolution of transmission data wherein said converted reception-possible resolution is displayed in said displaying step in the discrimination form that a coarseness of image represented by the reception-possible resolution of the transmission data is different from that of said designated resolution.

9. The control method of claim 8, wherein said transmission resolution is a resolution which is less than or equal to the designated resolution and a maximum value of reception-possible resolutions.

10. A facsimile apparatus for reading an original at a designated resolution, comprising:

first display means for displaying a designated original reading resolution;

means for identifying a reception-possible resolution of a reception-side facsimile apparatus;

discrimination means for discriminating whether or not the designated original reading resolution coincides with the reception-possible resolution;

conversion means for, when said discrimination means determines that the two resolutions do not coincide with each other, converting the designated original reading resolution into the reception-possible resolution having a coarseness of image different from that of said designated original reading resolution; and second display means for displaying the converted, reception-possible resolution as a resolution of transmission data.

11. A facsimile apparatus for reading an original at a designated resolution, comprising:

means for identifying a reception-possible resolution of a reception-side facsimile apparatus;

discrimination means for discriminating whether or not the designated original reading resolution coincides with the reception-possible resolution;

conversion means for, when said discrimination means determines that the two resolutions do not coincide with each other, converting the designated original reading resolution into the reception-possible resolution having a coarseness of image different from that of said designated original reading resolution;

transmission means for transmitting an image in said designated original reading resolution when said discrimination means discriminates a coincidence of the two resolutions and transmitting an image in the converted, reception-possible resolution when said discrimination means discriminates that the two resolutions do not coincide; and display means for displaying a resolution of the image transmitted by said transmission means, wherein said display means differentiates a displaying form depending upon whether said conversion means converts a coarseness of image of designated resolution of image.

12. A facsimile apparatus for reading an original at a designated resolution, comprising:

means for identifying a reception-possible resolution of a reception-side facsimile apparatus;

discriminating means for discriminating whether or not the designated original reading resolution coincides with the reception-possible resolution;

conversion means for, when said discrimination means determines that the two resolutions do not coincide with each other, converting the designated original reading resolution into the reception-possible resolution of a coarseness of image different from that of said designated original reading resolution;

transmission means for transmitting an image in said designated original reading resolution when said discrimination means discriminates a coincidence of the two resolutions and transmitting an image in the converted resolution when said discrimination means discriminates that the two resolutions do not coincide; and display means for displaying a resolution of the image transmitted by said transmission means, wherein said display means displays the converted, reception-possible resolution in the discriminating form that a coarseness of image represented by the resolution of the transmission data is different from that of said designated original reading resolution, and wherein said display means displays the converted, reception-possible resolution before said transmission means transmits an image which has been converted by said conversion means.

* * * * *